(12) United States Patent
Paintner et al.

(10) Patent No.: US 12,495,944 B2
(45) Date of Patent: Dec. 16, 2025

(54) COMPUTER PROGRAM PRODUCT FOR A ROBOT FOR OPERATING A DOMESTIC DISHWASHER, AND SYSTEM COMPRISING A DOMESTIC DISHWASHER AND A COMPUTER PROGRAM PRODUCT FOR A ROBOT

(71) Applicant: BSH Hausgeräte GmbH, Munich (DE)

(72) Inventors: Kai Paintner, Welden (DE); Michael Rupp, Holzheim (DE)

(73) Assignee: BSH Hausgeräte GmbH, Munich (DE)

( * ) Notice: Subject to any disclaimer, the term of this patent is extended or adjusted under 35 U.S.C. 154(b) by 428 days.

(21) Appl. No.: 17/912,878

(22) PCT Filed: Mar. 11, 2021

(86) PCT No.: PCT/EP2021/056170
§ 371 (c)(1),
(2) Date: Sep. 20, 2022

(87) PCT Pub. No.: WO2021/197792
PCT Pub. Date: Oct. 7, 2021

(65) Prior Publication Data
US 2023/0165427 A1 Jun. 1, 2023

(30) Foreign Application Priority Data
Mar. 30, 2020 (DE) .......................... 102020204083.4

(51) Int. Cl.
*A47L 15/00* (2006.01)
*A47L 15/46* (2006.01)
*B25J 11/00* (2006.01)

(52) U.S. Cl.
CPC .......... *A47L 15/0018* (2013.01); *A47L 15/46* (2013.01); *B25J 11/008* (2013.01); *A47L 2401/04* (2013.01); *A47L 2501/36* (2013.01)

(58) Field of Classification Search
CPC .. A47L 15/0018; A47L 15/46; A47L 2401/04; A47L 2501/36; B25J 11/008
(Continued)

(56) References Cited

U.S. PATENT DOCUMENTS

2007/0239315 A1* 10/2007 Sato ........................ B25J 9/1612
700/245
2010/0043834 A1* 2/2010 Scheringer ............ A47L 15/241
134/25.2
(Continued)

FOREIGN PATENT DOCUMENTS

CN 108042073 A * 5/2018 ............. A47L 15/39
DE 19744488 A1 4/1999
(Continued)

OTHER PUBLICATIONS

National Search Report DE 10 2020 204 083.4 dated Mar. 12, 2021.
International Search Report PCT/EP2021/056170 dated Mar. 14, 2021.

*Primary Examiner* — Michael E Barr
*Assistant Examiner* — Thomas Bucci
(74) *Attorney, Agent, or Firm* — Michael E. Tschupp; Andre Pallapies; Brandon G. Braun

(57) ABSTRACT

A computer program product for a robot which includes a computer for operating a household dishwasher having a plurality of treatment programs is disclosed. The computer program product includes a non-transitory computer readable medium having commands which when the computer program product is run by the computer prompt the robot to carry out the steps of loading dishwasher skills which are specific to the household dishwasher from a storage device, and carrying out at least some of the loaded dishwasher skills in order to operate the household dishwasher.

20 Claims, 4 Drawing Sheets

(58) Field of Classification Search
USPC .......................................................... 134/56 D
See application file for complete search history.

(56) References Cited

U.S. PATENT DOCUMENTS

| | | | |
|---|---|---|---|
| 2018/0036889 A1* | 2/2018 | Birkmeyer | ........... B25J 15/0608 |
| 2018/0106885 A1 | 4/2018 | Blayvas | |
| 2019/0167068 A1* | 6/2019 | Yoon | ........................ A47L 15/24 |
| 2019/0358822 A1 | 11/2019 | Wojciechowski | |
| 2019/0366554 A1 | 12/2019 | Breugelmans | |
| 2020/0015623 A1* | 1/2020 | Kim | .......................... A23L 5/10 |
| 2020/0085275 A1* | 3/2020 | Lee | ..................... A47L 15/0063 |
| 2021/0060797 A1* | 3/2021 | Shin | ........................ B65G 47/91 |
| 2021/0093150 A1* | 4/2021 | Shin | .................... A47L 15/4295 |
| 2021/0174370 A1* | 6/2021 | Yim | ................. G06Q 10/06316 |

FOREIGN PATENT DOCUMENTS

| | | | | | |
|---|---|---|---|---|---|
| WO | WO-2015194760 A1 * | 12/2015 | ............. | A47L 15/42 |
| WO | WO-2019012870 A1 * | 1/2019 | ............. | A47L 15/00 |
| WO | WO-2019012878 A1 * | 1/2019 | ............. | A47L 15/00 |

* cited by examiner

COMPUTER PROGRAM PRODUCT FOR A ROBOT FOR OPERATING A DOMESTIC DISHWASHER, AND SYSTEM COMPRISING A DOMESTIC DISHWASHER AND A COMPUTER PROGRAM PRODUCT FOR A ROBOT

CROSS-REFERENCES TO RELATED APPLICATIONS

This application is the U.S. National Stage of International Application No. PCT/EP2021/056170, filed Mar. 11, 2021, which designated the United States and has been published as International Publication No. WO 2021/197792 A1 and which claims the priority of German Patent Application, Serial No. 10 2020 204 083.4, filed Mar. 30, 2020, pursuant to 35 U.S.C. 119 (a)-(d).

The contents of International Application No. PCT/EP2021/056170 and German Patent Application, Serial No. 10 2020 204 083.4 are incorporated herein by reference in their entireties as if fully set forth herein.

BACKGROUND OF THE INVENTION

The present invention relates to a computer program product for a robot comprising a computer for operating a household dishwasher, a system comprising a household dishwasher and such a computer program product for a robot, as well as a method for operating a robot for operating a household dishwasher.

A household dishwasher occasionally comprises a washing container which may be closed by a door and which has a number of receptacles for items to be washed for receiving items to be washed, and a control device for performing a washing program from a plurality of washing programs for washing items to be washed.

For loading the receivers for items to be washed of the washing container, the user receives help simply from the printed instruction manual of the dishwasher, the printed handbook of the dishwasher or teaching videos from the Internet. However, this is all very time-consuming for the user and is also not regularly used.

Due to the sub-optimal loading of the washing container, this may result in sub-optimal cleaning results and/or increased energy consumption.

There are also users who do have not the capability and/or the knowledge to operate a household dishwasher optimally. In this case, it is known for a robot to operate a household dishwasher in order to assist the user. A conventional solution therefor is disclosed, for example, in DE 19 744 488 B4.

Against this background, an object of the present invention is to improve further the operation of a household dishwasher.

According to a first aspect, a computer program product for a robot comprising a computer for operating a household dishwasher, having a plurality of treatment programs, is proposed, wherein the computer program product comprises commands which prompt the robot to carry out the following steps when the computer program product is run by the computer:

loading dishwasher skills which are specific to the household dishwasher from a storage device, and
carrying out at least some of the loaded dishwasher skills in order to operate the household dishwasher.

The robot is, for example, part of the same household as the household dishwasher. By means of the present computer program product it is possible to load dishwasher skills which are specific to a specific household dishwasher from a storage device, for example from a cloud storage device. Moreover, by means of the present computer program product it is possible to carry out at least some of the loaded dishwasher skills in order to operate the household dishwasher. If the robot is, for example, a universal robot and is used in a specific household, therefore, it is not known in advance which household dishwasher is used in this specific household. If, however, the robot is used for the first time in the specific household, the dishwasher skills which are specific to the household dishwasher used in the specific household may be loaded from the storage device, and the robot is then able to carry out the loaded dishwasher skills for the operation of the specific household dishwasher in the specific household by means of the present computer program product.

Thus it is possible that a robot may be used for a plurality of different household dishwashers, for example from the same dishwasher manufacturer, since the specific dishwasher skills for the specific household dishwasher may only be loaded and carried out, for example, in situ in the specific household. Thus advantageously a priori mapping between the household dishwasher and the robot is not necessary before use in a specific household. Such a priori mapping might be time-consuming and costly.

The dishwasher skill may also be denoted as a dishwasher capability, ability or skill. The dishwasher skill may also be configured as a function.

The household dishwasher has, in particular, a control device for performing a treatment program from a plurality of treatment programs. For example, the treatment program may comprise a washing program for washing items to be washed and/or a cleaning program for cleaning parts of the household dishwasher, for example a filter.

The control device may be implemented in terms of hardware technology and/or software technology. The control device is integrated, in particular, in the household dishwasher. Alternatively, the control device may also be arranged outside the household dishwasher. In the case of an implementation in terms of hardware technology, the control device may be configured, for example, as a computer or as a microprocessor. In the case of an implementation in terms of software technology, the control device may be configured as a computer program product, as a function, as a routine, as part of a program code or as an executable object.

As set forth above, the control device is designed to perform a washing program from a plurality of washing programs for washing the items to be washed. A washing program comprises, for example, different sub-program steps, such as for example pre-rinsing, cleaning, rinsing with rinse aid and/or drying. Different washing programs differ, for example, in the sequence and/or type of sub-program steps and in the different operating parameters, such as for example a duration and/or washing liquor temperature of one or more sub-program steps.

Items to be washed are arranged in the washing chamber in order to be washed by the household dishwasher, in particular on one or more receptacles for items to be washed. The items to be washed comprise, in particular, various dishes, cutlery and/or utensils which serve for the preparation, the storage and/or the consumption of food. These items are, for example, plates, pots, cups, knives, glasses and the like. In particular, at least one detergent is used for the washing. The detergent comprises, for example, cleaning agents, rinse aid, bleach, enzymes and/or salt.

According to one embodiment, the computer program product comprises commands which prompt the robot to carry out the following steps when the computer program product is run by the computer:

identifying a type of household dishwasher, loading dishwasher skills which are specific to the identified type of household dishwasher from the storage device, and carrying out at least some of the loaded dishwasher skills in order to operate the household dishwasher.

In this embodiment, the computer program product enables the robot to identify the type of household dishwasher. For example, the robot comprises an optical sensor which may detect an optical sensor signal of the household dishwasher. The computer program product evaluates the optical sensor signal of the household dishwasher, for example carries out a pattern comparison on the basis of stored reference patterns, and thus identifies the household dishwasher used in the household. Then the dishwasher skills which are specific to the identified type of household dishwasher may be loaded from the storage device and subsequently carried out.

According to a further embodiment, the computer program product comprises commands which prompt the robot to carry out the following steps when the computer program product is run by the computer:

receiving a signal indicative of a user input by a user, selecting at least one subset of loaded dishwasher skills as a function of the received signal, and carrying out the selected subset of loaded dishwasher skills in order to operate the household dishwasher.

In this embodiment, the user may control the computer program product and thus the robot via a user input. Here is an example:

The user wishes the household dishwasher to be filled with items to be washed. To this end, the user outputs a voice command, such as for example "robot, please fill the dishwasher with items to be washed which are in the sink". This user input is received by a voice recognition system of the robot and converted into a signal indicative of the voice command provided. The computer program product receives the signal indicative thereof, selects for example a loaded skill as a function of the received signal and carries out the loaded skill for loading the household dishwasher with the items to be washed.

According to a further embodiment, the loaded dishwasher skills comprise loading the household dishwasher with items to be washed.

The present dishwasher skill is loading or filling the household dishwasher with items to be washed. Here the robot replaces the user. In this case, further dishwasher skills, such as for example a detection of a type and shape of dishes, may also be used in order to fill the household dishwasher optimally. As a result, the respective dishes may be filled into the washing container in an optimal position, such as for example pots in the lower basket and glasses in the upper basket. Further dishwasher skills, which are advantageously used here, are the detection of the degree of soiling and type of dirt. As a function of these dishwasher skills, the filling may also be adapted on the basis of the detected soiling, the detected type of dirt and/or the degree of drying of the dirt.

According to a further embodiment, the loaded dishwasher skills comprise selecting and starting one of the treatment programs of the household dishwasher.

If it is detected, for example, that the items to be washed comprise stubborn soiling, such as for example starch, in the present embodiment a program with heated pre-rinsing may be selected and cleaning agents may be already supplied during the pre-rinsing. Thus the optimal treatment program may be selected and carried out by the computer program product. Moreover, due to the position of the items to be washed, the washing pressure may also be regulated via the pump speed. If, for example, items to be washed with significant and stubborn soiling were to be present in the washing container, the robot would be able to perform pre-cleaning. Furthermore, the robot may brush, for example, the items to be washed and apply a special enzyme or bleach-containing cleaning agents onto the items to be washed and provide an exposure time.

According to a further embodiment, the loaded dishwasher skills comprise unloading items to be washed from the household dishwasher.

In this embodiment, by means of the present computer program product the robot may also unload items to be washed from the household dishwasher when the dishwasher has finished.

According to a further embodiment, the loaded dishwasher skills comprise introducing detergent into the household dishwasher.

In this embodiment, by means of the computer program product the robot may also introduce or fill detergent, in particular the appropriate detergent, into the household dishwasher.

According to a further embodiment, the loaded dishwasher skills comprise actuating an adjustable part of one of the receptacles for items to be washed of a washing container of the household dishwasher. Examples of adjustable parts comprise cup supports and spikes.

According to a further embodiment, the loaded dishwasher skills comprise carrying out a smart function, such as lifting the lower basket. Further examples of smart functions comprise an automatic basket pull-out and an automatic door opening.

According to a further embodiment, the loaded dishwasher skills comprise adjusting a cup support in the washing container.

According to a further embodiment, the loaded dishwasher skills comprise removing a removable holder from the washing container of the household dishwasher.

According to a further embodiment, the loaded dishwasher skills comprise arranging a removable holder in the washing container.

Removable holders exist, such as, for example, for yoghurt pots. By means of the present computer program product, the robot may automatically remove and/or insert these holders.

According to a further embodiment, the loaded dishwasher skills comprise detecting a first optical sensor signal of items to be washed, in particular by means of an optical sensor of the robot.

According to a further embodiment, the loaded dishwasher skills comprise detecting a second optical sensor signal of a washing container of the household dishwasher, in particular by means of the optical sensor of the robot.

According to a further embodiment, the loaded dishwasher skills comprise detecting a third optical sensor signal of a detergent for washing the items to be washed, in particular by means of the optical sensor of the robot.

According to a further embodiment, the optical sensor comprises a camera, wherein the optical sensor signal comprises an image and/or a video.

The detected optical sensor signals may be used, for example, for pattern recognition or transmitted to an external device or to an external server, or even to the household dishwasher itself.

According to a further embodiment, the loaded dishwasher skills comprise an object recognition of the items to be washed on the basis of the detected first optical sensor signal.

According to a further embodiment, the loaded dishwasher skills comprise an object recognition of objects located in the washing container on the basis of the detected second optical sensor signal.

According to a further embodiment, the loaded dishwasher skills comprise an object recognition of the detergent on the basis of the detected third optical sensor signal.

The respective object recognition may be used for optimizing the operation of the household dishwasher.

By means of the object recognition, the robot is able to optimize the loading with the purpose of achieving an optimal cleaning and drying result.

According to a further embodiment, the loaded dishwasher skills comprise a transmission of data, in particular the optical sensor signals and/or data indicative of the object recognition, from and to the household dishwasher.

For example the household dishwasher may provide the robot with sensor data and usage data. In this case, for example, a direct communication path, for example via radio, may be used. However, an indirect communication path via the Internet may also be selected. As a function of the received sensor data and usage data the robot is better able to carry out specific activities, such as for example filling rinse aid and salt, setting the water hardness and carrying out a machine cleaning program.

Moreover, it is also possible that the robot acts as a sensor for the household dishwasher. In other words, the sensor data is detected by the robot and transmitted to the household dishwasher via one of the communication interfaces. The control device of the household dishwasher may then use the received sensor data in order to optimize the operation of the household dishwasher.

According to a further embodiment, the loaded dishwasher skills comprise an output of a recommendation to the user for operating the household dishwasher.

To this end, the robot preferably comprises an output unit for outputting the recommendation to the user. The output unit comprises, in particular, a visual and/or audio output. For example, the output unit comprises a screen and/or a loudspeaker. In this case, the output unit may be designed for outputting the position recommendation to the user for using an augmented reality display or a virtual reality display.

According to a further embodiment, the loaded dishwasher skills comprise an output of an instruction to the user for the maintenance of the household dishwasher.

For example, detected usage data, such as the selected program structure, loading, soiling on the items to be washed, development of cloudiness of the washing liquor, times between washing cycles, times between the program end and emptying, provide good indications of maintenance intervals. This usage data may be detected and exchanged between the household dishwasher and robot via the communication interface. Moreover, the computer program product may evaluate the usage data and use it to create instructions for the user.

If, for example, low-temperature programs are selected or these programs result from the loading and type of dirt, for example, after a number of cycles a high temperature profile may be started for thorough cleaning to ensure hygiene.

According to a further embodiment, the loaded dishwasher skills comprise a maintenance of the household dishwasher by the robot.

As already set forth above, the maintenance of the household dishwasher may comprise filling of rinse aid, filling of salt, setting of water hardness and/or performing a cleaning program.

According to a further embodiment, the loaded dishwasher skills comprise loading a treatment program from a storage device which is preferably part of a cloud. The treatment program is, for example, a washing program which is optimally adapted to the combination of robot and household dishwasher.

According to a further embodiment, the loaded dishwasher skills comprise a provision of feedback relative to a treatment program performed by the household dishwasher.

By means of the computer program product, the robot may also be capable of providing feedback relative to the performance of the household dishwasher, whereby the washing process may be optimized. For example, the user may provide feedback to the robot via a user interface relative to cleaning, drying, running time, odor and/or state of cleanliness of the household dishwasher. This data may then be used in order to adapt the washing process relative to program parameters. The program parameters comprise, for example, the cleaning intensity, the drying intensity and the program duration.

Alternatively or additionally, by means of the computer program product, the robot may also be part of the sensor providing feedback. To this end, for example when emptying the dishwasher after the washing cycle, the robot may analyze weak points on the items to be washed, for example regarding drying and/or cleaning and provide feedback relative thereto.

According to a further embodiment, the loaded dishwasher skills comprise a provision of feedback relative to a treatment program performed by the household dishwasher on the basis of an object recognition performed, in particular, as described above. In this case, the robot is able to evaluate by object recognition the performance after the treatment program has been performed, and to enable the result to be incorporated in the washing process, in particular in the choice of treatment program and cleaning agent, and in the loading process.

Moreover, the robot may also at least partially undertake customer service functions, for example on the basis of usage data such as NTC values and power consumption of the circulating pump, and after an initial analysis make contact with customer services in order to arrange repair work by customer services in an efficient manner.

According to a further embodiment, the computer program product comprises commands which prompt the robot to generate a further dishwasher skill when the computer program product is run by the computer, on the basis of a loaded instruction manual of the household dishwasher, on the basis of a loaded handbook of the household dishwasher and/or on the basis of tracked usage data of the household dishwasher.

According to a further embodiment, the storage device from which the dishwasher skills which are specific to the household dishwasher are loaded is part of a cloud.

A computer program product, such as for example a computer program means, may be provided or delivered for example as a storage medium, such as, for example, a memory card, USB stick, CD-ROM, DVD, or even in the form of downloadable file from a server in a network. This may be carried out, for example, in a wireless communication network by the transmission of a corresponding file with the computer program product or the computer program means.

According to a second aspect, a system comprising a household dishwasher and a computer program product for a robot according to the first aspect or one of the embodiments of the first aspects is proposed. In particular, the system also comprises the robot.

According to a further embodiment, the household dishwasher and/or the robot are able to be coupled to an external device, in particular to an app which may be installed on the external device.

The external device, in particular, is a mobile device. The mobile device is, for example, a smartphone, a tablet or a tablet computer. The app may also be denoted as an application, application software or application program. The app may be configured, in particular, as a program, as a computer program, as software, as a computer program product, as a function, as a routine, as part of a program code or an executable object.

In particular, the household dishwasher and the robot in each case comprise a communication unit which may be coupled, for example, by means of a network to the external device and thus to the app installed on the external device. The network comprises in this case, in particular, a mobile communications network, a WLAN, and/or a further wireless or wired data network.

According to a third aspect, a method for operating a robot comprising a computer for operating a household dishwasher having a plurality of treatment programs is proposed. The method comprises the following steps:

storing dishwasher skills which are specific to the household dishwasher in the robot, and carrying out at least some of the loaded dishwasher skills by the robot in order to operate the household dishwasher.

The embodiments and features described relative to the proposed computer program product accordingly apply to the proposed method.

Further possible implementations of the invention also comprise not explicitly cited combinations of features or embodiments described above or below relative to the exemplary embodiments. In this case, the person skilled in the art will also add individual aspects as improvements or additions to the respective basic form of the invention.

Further advantageous embodiments and aspects of the invention form the subject of the sub-claims and the exemplary embodiments of the invention described below. The invention is described in more detail hereinafter by way of preferred embodiments with reference to the accompanying figures.

DETAILED DESCRIPTION OF EXEMPLARY EMBODIMENTS OF THE PRESENT INVENTION

Figure 1:
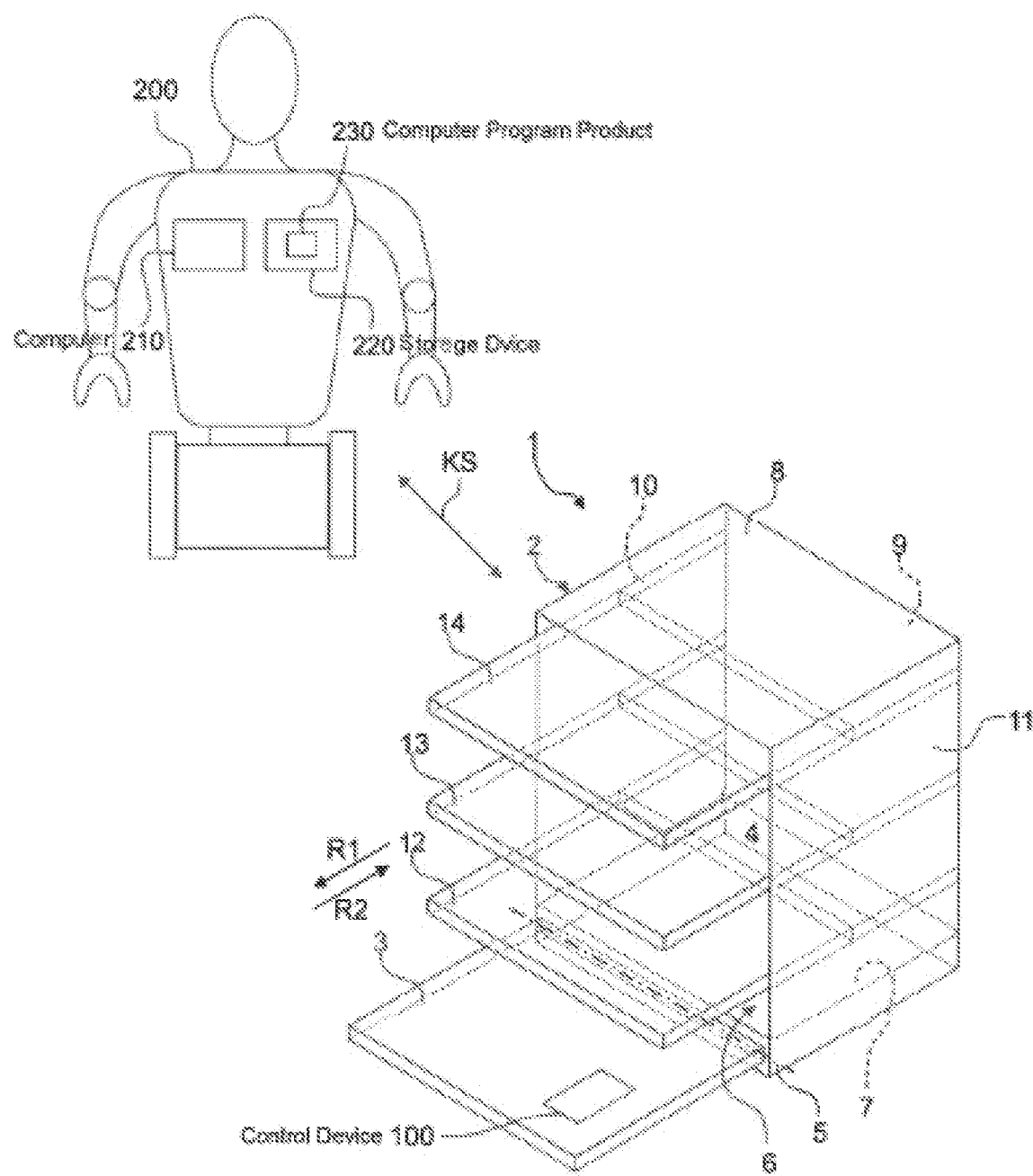
FIG. 1 shows a schematic perspective view of a first exemplary embodiment of a system comprising a household dishwasher and a robot.

Elements which are the same or functionally the same have been provided in the figures with the same reference characters, unless specified otherwise.

FIG. 1 shows a schematic perspective view of an exemplary embodiment of a system comprising a household dishwasher 1 and a robot 200. The household dishwasher 1 comprises a washing container 2 which may be closed by a door 3, in particular in a water-tight manner. To this end, a sealing device (not shown) may be provided between the door 3 and the washing container 2. The washing container 2 is preferably cuboidal. The washing container 2 may be arranged in a housing of the household dishwasher 1. The washing container 2 and the door 3 may form a washing chamber 4 for washing items to be washed.

The door 3 is shown in FIG. 1 in the open position thereof. The door 3 may be closed or opened by pivoting about a pivot axis 5 provided at a lower end of the door 3. A loading opening 6 of the washing container 2 may be closed or opened by means of the door 3. The washing container 2 has a bottom 7, a ceiling 8 arranged opposite the bottom 7, a rear wall 9 arranged opposite the closed door 3 and two side walls 10, 11 arranged opposite one another. The bottom 7, the ceiling 8, the rear wall 9 and the side walls 10, 11 may be produced, for example, from a stainless steel sheet. The bottom 7 may be produced alternatively from a plastics material, for example.

The household dishwasher 1 also has at least one receptacle for items to be washed 12, 13, 14. Preferably, a plurality of receptacles for items to be washed 12, 13, 14, for example three thereof, may be provided, wherein the receptacle for items to be washed 12 may be a lower receptacle for items to be washed or a lower basket, the receptacle for items to be washed 13 may be an upper receptacle for items to be washed or an upper basket, and the receptacle for items to be washed 14 may be a cutlery drawer. As FIG. 1 also shows, the receptacles for items to be washed 12, 13, 14 are arranged one above the other in the washing container 2. Each receptacle for items to be washed 12, 13, 14 is able to be displaced selectively into or out of the washing container 2. In particular, each receptacle for items to be washed 12, 13, 14 is able to be pushed into the washing container 2 in a push-in direction R1 and pulled out of the washing container 2 in a pull-out direction R2 counter to the push-in direction R1.

The household dishwasher 1 additionally has a control device 100. The control device 100 is designed to carry out a treatment program from a plurality of treatment programs. The treatment program is, for example, a washing program for washing items to be washed in the washing container 2.

The robot 200 of FIG. 1 is, for example, a universal robot for assisting in the household. The robot 200 comprises a computer 210 and a storage device 220. A computer program product 230 is occasionally stored in the storage device 220.

Figure 3:
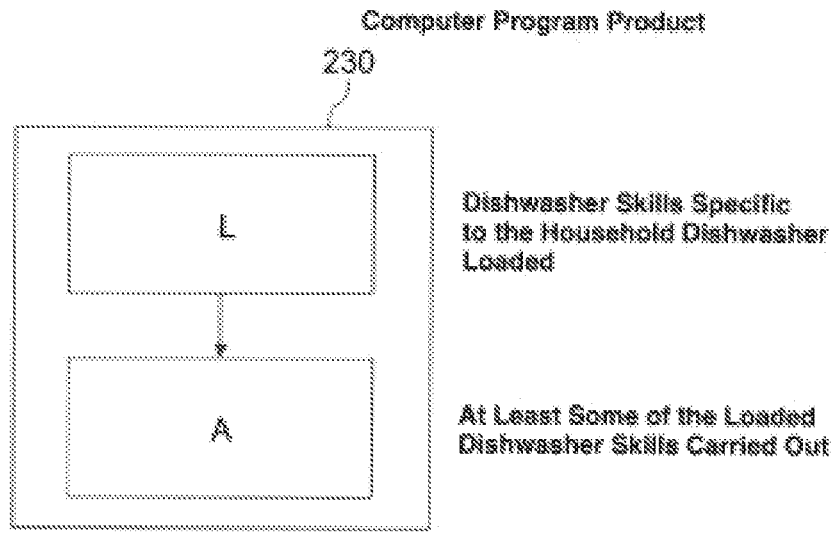
FIG. 3 shows a schematic view of a first exemplary embodiment of a computer program product for the robot according to FIG. 1 or FIG. 2.

The computer program product 230 for the robot 200 is designed to operate the household dishwasher 1. The computer program product 230 comprises commands which prompt the robot 200 to carry out the steps shown in FIG. 3 for the computer program product 230, when the computer program product 230 is run by the computer 210.

Figure 2:
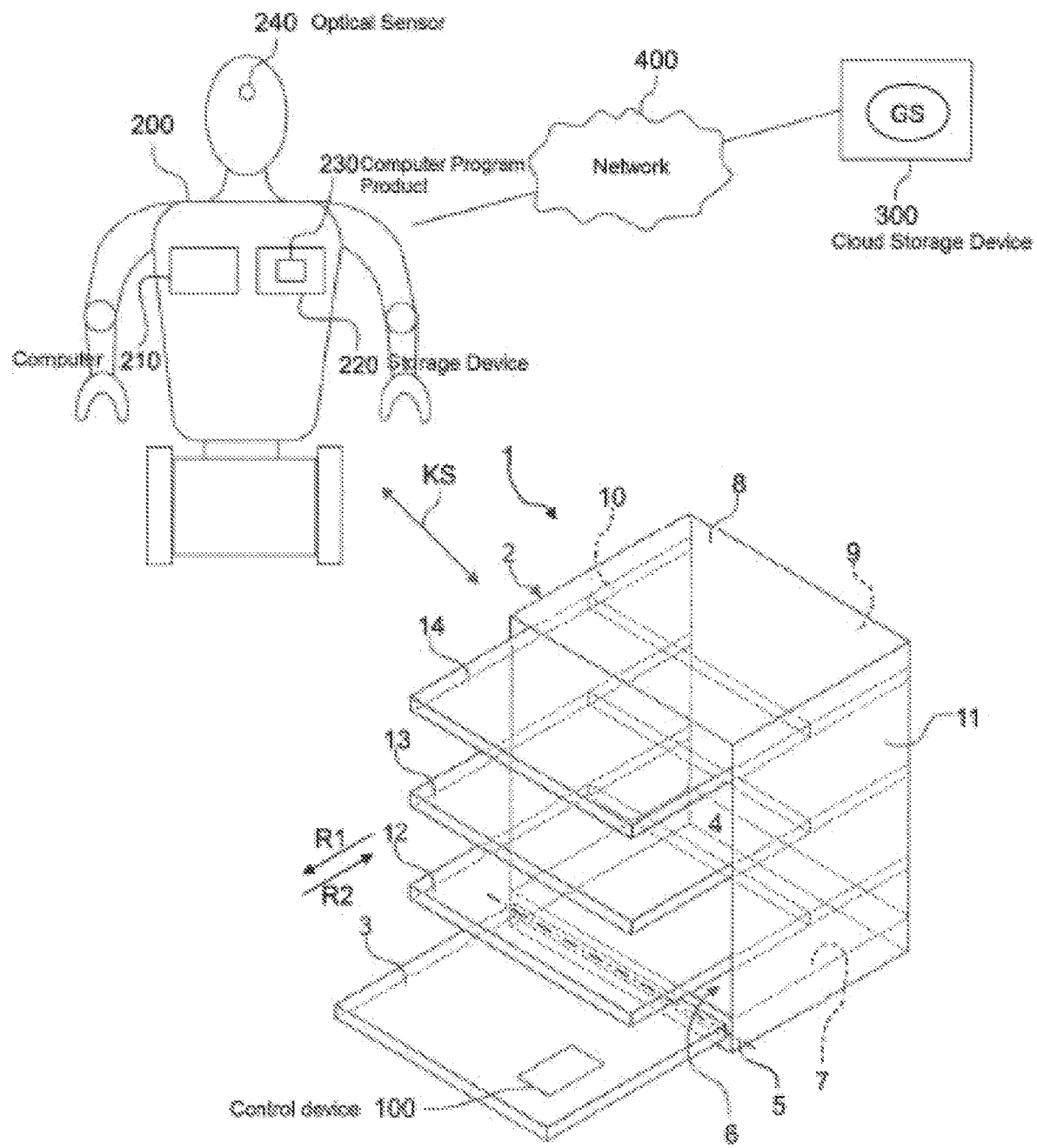
FIG. 2 shows a schematic perspective view of a second exemplary embodiment of a system comprising a household dishwasher and a robot.

In a step L a dishwasher skill GS which is specific to the household dishwasher 1 is loaded from a storage device 220 or 300. To this end, FIG. 1 shows an exemplary embodiment in which the dishwasher skill or the dishwasher skills are loaded from the storage device 220 of the robot into the computer 210 of the robot 200. FIG. 2 shows an alternative in which the robot 200 is coupled to a cloud storage device 300 via a network 400, for example the Internet. In the exemplary embodiment of FIG. 2, the dishwasher skill GS or the dishwasher skills GS is or are loaded from the cloud storage device 300 via the network 400 into the computer 210 of the robot 200.

In a step A (see FIG. 3) at least some of the loaded dishwasher skills GS are carried out in order to operate the household dishwasher 1. Examples of the dishwasher skills GS comprise: loading the household dishwasher 1 with items to be washed, selecting and starting one of the treatment programs of the household dishwasher 1, unloading items to be washed from the household dishwasher 1, introducing detergent into the household dishwasher 1, actuating an adjustable part of one of the receptacles for items to be washed 12, 13, 14 of the washing container 2 of the household dishwasher 1, adjusting a cup support in the washing container 2, removing a removable holder from the washing container, arranging a removable holder in the washing container 2, detecting a first optical sensor signal of items to be washed, detecting a second optical sensor signal of a washing container 2, detecting a third optical sensor signal of a detergent for washing the items to be washed, object recognition of items to be washed on the basis of the detected first optical sensor signal, object recognition of objects located in the washing container 2 on the basis of the detected second optical sensor signal, object recognition of the detergent on the basis of the detected third optical sensor signal, transmission of data from and to the household dishwasher 1, output of a recommendation to the user for operating the household dishwasher 1, output of an instruction to the user for the maintenance of the household dishwasher 1, maintenance of the household dishwasher 1 by the robot 200 and provision of feedback relative to a treatment program performed by the household dishwasher 1.

The computer program product 230 may also be designed to generate a dishwasher skill GS itself, and namely on the basis of a loaded instruction manual of the household dishwasher 1, on the basis of a loaded handbook of the household dishwasher 1 and/or on the basis of tracked usage data of the household dishwasher 1.

The double arrow in FIG. 1 shows a communication interface KS which is configured between the household dishwasher 1 and the robot 200. The communication interface KS comprises, for example, Bluetooth or WLAN.

Figure 4:
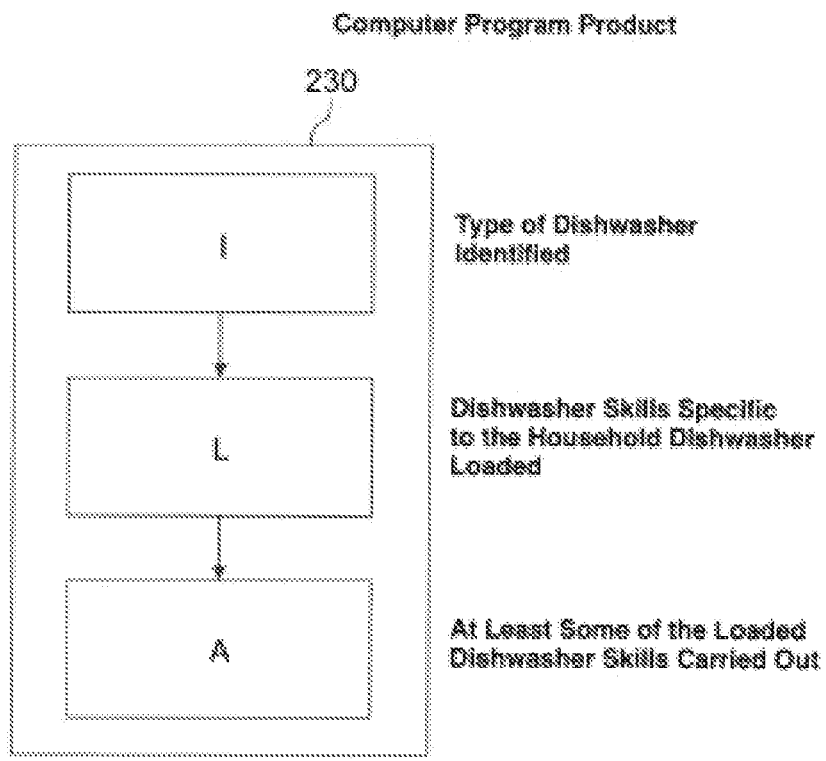
FIG. 4 shows a schematic view of a second exemplary embodiment of a computer program product for the robot according to FIG. 1 or FIG. 2.

In FIG. 4 a second exemplary embodiment of the computer program product 230 is illustrated. The computer program product 230 of FIG. 4 comprises the following steps:

In a step I a type of household dishwasher 1 is identified. To this end, the robot 200 uses, for example, an optical sensor 240 (see FIG. 2) for detecting an optical sensor signal of the household dishwasher 1.

In a step L dishwasher skills GS which are specific to the identified type of household dishwasher 1 are loaded from the storage device 220 and/or from the storage device 300.

In a step A at least some of the loaded dishwasher skills GS are carried out in order to operate the household dishwasher 1.

Figure 5:
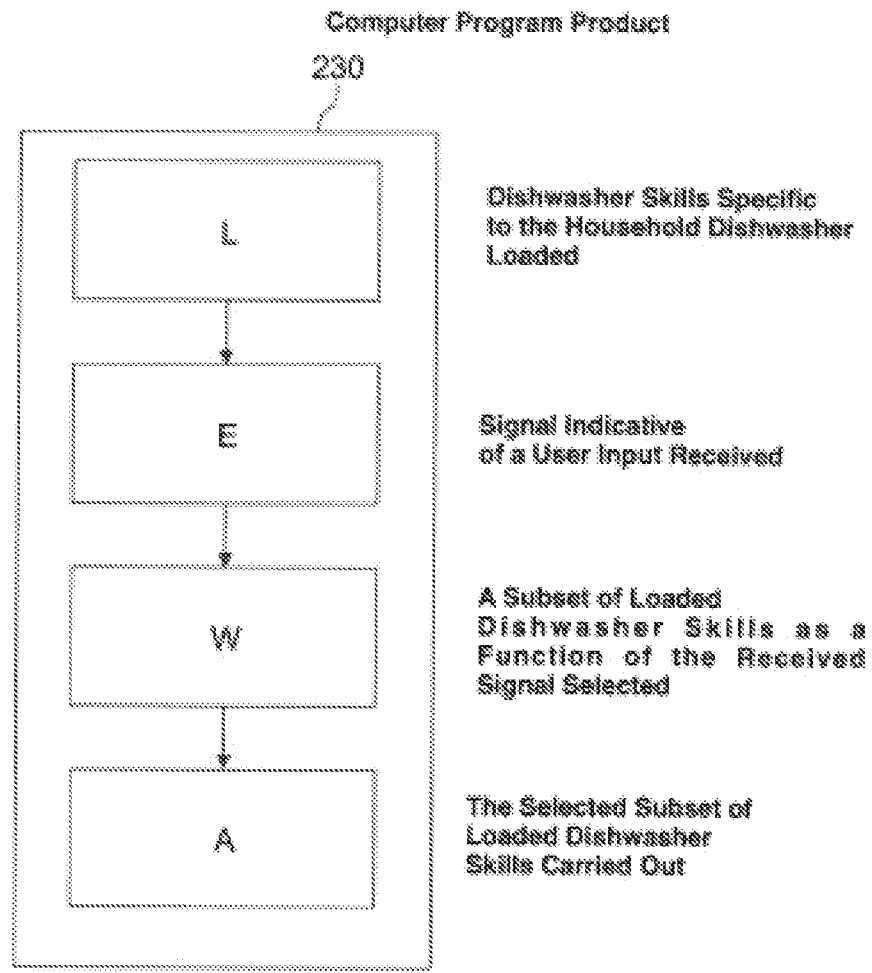
FIG. 5 shows a schematic view of a third exemplary embodiment of a computer program product for the robot according to FIG. 1 or FIG. 2.

FIG. 5 shows a schematic view of a third exemplary embodiment of the computer program product 230 for the robot 200 according to FIG. 1 or FIG. 2. The computer program product 230 of FIG. 5 comprises the following four steps:

In a step L dishwasher skills GS which are specific to the household dishwasher 1 are loaded from a storage device 220 or 300. In a step E a signal indicative of a user input by a user is received. In a step W a subset of loaded dishwasher skills GS is selected as a function of the received signal. In a step A the selected subset of loaded dishwasher skills GS is carried out in order to operate the household dishwasher 1.

Figure 6:
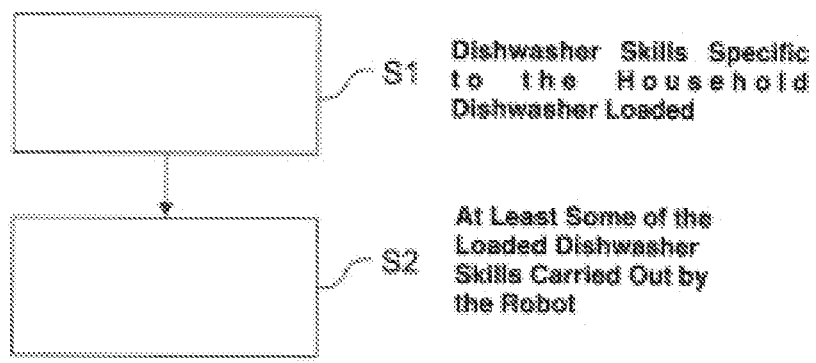
FIG. 6 shows a schematic block diagram of an exemplary embodiment of a method for operating a robot.

FIG. 6 shows a schematic block diagram of an exemplary embodiment of a method for operating a robot 200. Such a robot 200 is shown, for example, in FIG. 1 or in FIG. 2. The robot 200 comprises a computer 210 for operating a household dishwasher 1 (see FIG. 1 or FIG. 2) having a plurality of treatment programs. The method according to FIG. 6 comprises the steps S1 and S2:

In step S1 dishwasher skills GS which are specific to the household dishwasher 1 are stored in the robot 200, for example in the storage device 220 of FIG. 1.

In step S2 at least some of the loaded dishwasher skills GS are carried out by the robot 200 in order to operate the household dishwasher 1. The dishwasher skills GS are preferably generated on the basis of an instruction manual of the household dishwasher 1, on the basis of a handbook of the household dishwasher 1 and/or on the basis of usage data of the household dishwasher 1 tracked during the operation of the household dishwasher 1. The tracked usage data is transmitted, for example, via the communication interface KS of FIG. 1 or FIG. 2 from the household dishwasher 1 to the robot 200.

Whilst the present invention has been described with reference to exemplary embodiments, it may be modified in many different ways.

The invention claimed is:

1. A computer program product for a robot which comprises a computer for operating a household dishwasher having a plurality of treatment programs, said computer program product comprising a non-transitory computer readable medium comprising commands which when the computer program product is run by the computer prompt the robot to carry out the steps of:
    identifying a type of the household dishwasher, the household dishwasher comprising one or more receptacles on which to arrange one or more items to be washed;
    loading dishwasher skills which are specific to the identified type of the household dishwasher from a storage device, the loaded dishwasher skills comprising a dishwasher skill related to a maintenance operation of the household dishwasher; and
    carrying out at least some of the loaded dishwasher skills in order to operate the household dishwasher.

2. The computer program product of claim 1, further comprising further commands which when the computer program product is run by the computer prompt the robot to carry out the steps of:
    receiving a signal indicative of a user input by a user;
    selecting at least one subset of loaded dishwasher skills as a function of the received signal; and
    carrying out the selected subset of loaded dishwasher skills in order to operate the household dishwasher.

3. The computer program product of claim 1, wherein the loaded dishwasher skills further comprise at least one member selected from the group consisting of loading the household dishwasher with the one or more items to be washed, selecting and starting one of the plurality of treatment programs of the household dishwasher, unloading the one or more items to be washed from the household dishwasher, introducing detergent into the household dishwasher, actuating an adjustable part of the one or more receptacles for the one or more items to be washed of a washing container of the household dishwasher, adjusting a cup support in the washing container of the household dishwasher, removing a removable holder from the washing container of the household dishwasher, and arranging the removable holder in the washing container of the household dishwasher.

4. The computer program product of claim 1, wherein the loaded dishwasher skills further comprise at least one member selected from the group consisting of detecting a first optical sensor signal of the one or more items to be washed, detecting a second optical sensor signal of a washing container of the household dishwasher, and detecting a third optical sensor signal of a detergent for washing the one or more items to be washed.

5. The computer program product of claim 4, wherein the first, second, and third optical sensor signals are detectable by an optical sensor of the robot.

6. The computer program product as claimed in claim 4, wherein the loaded dishwasher skills further comprise an object recognition of the one or more items to be washed based on the detected first optical sensor signal, an object recognition of objects located in the washing container based on the detected second optical sensor signal, and/or an object recognition of the detergent based on the detected third optical sensor signal.

7. The computer program product of claim 6, wherein the loaded dishwasher skills further comprise a transmission of data of the first, second, or third optical sensor signals and/or data indicative of the object recognition, from and to the household dishwasher.

8. The computer program product of claim 1, wherein the loaded dishwasher skills further comprise at least one member selected from the group consisting of an output of a recommendation to a user for operating the household dishwasher, and a provision of feedback relative to a particular treatment program of the plurality of treatment programs performed by the household dishwasher.

9. The computer program product of claim 1, further comprising further commands which when the computer program product is run by the computer prompt the robot to carry out the step of generating a further one of the dishwasher skills based on a loaded instruction manual of the household dishwasher, based on a loaded handbook of the household dishwasher, or based on tracked usage data of the household dishwasher.

10. The computer program product as claimed in claim 1, wherein the robot is communicatively coupled to the storage device that is part of a cloud, and wherein the dishwasher skills are loaded from the storage device via a network into the computer of the robot.

11. The computer program product of claim 1, wherein the maintenance operation is performed by the robot.

12. The computer program product of claim 1, further comprising further commands which when the computer program product is run by the computer prompt the robot to carry out the step of:

outputting an instruction to a user to perform the maintenance operation.

13. A system, comprising:
a household dishwasher including a plurality of treatment programs and comprising one or more receptacles on which to arrange one or more items to be washed; and
a computer program product comprising a non-transitory computer readable medium comprising commands which when the computer program product is run causes execution of the steps of:
identifying a type of the household dishwasher;
loading dishwasher skills which are specific to the identified type of the household dishwasher from a storage device, the loaded dishwasher skills comprising a dishwasher skill related to a maintenance operation of the household dishwasher; and
carrying out at least some of the loaded dishwasher skills in order to operate the household dishwasher.

14. The system of claim 13, further comprising a robot comprising a computer configured to run the computer program product for operating the household dishwasher.

15. The system of claim 14, wherein the maintenance operation is performed by the robot.

16. The system of claim 13, further comprising further commands which when the computer program product is run causes execution of the step of:
outputting an instruction to a user to perform the maintenance operation.

17. A method for operating a robot comprising a computer for operating a household dishwasher which includes a plurality of treatment programs, said method comprising:
identifying a type of the household dishwasher, the household dishwasher comprising one or more receptacles on which to arrange one or more items to be washed;
storing dishwasher skills which are specific to the identified type of the household dishwasher in the robot, the stored dishwasher skills comprising a dishwasher skill related to a maintenance operation of the household dishwasher; and
carrying out at least some of the stored dishwasher skills by the robot in order to operate the household dishwasher.

18. The method of claim 17, wherein the dishwasher skills are generated based on an instruction manual of the household dishwasher, based on a handbook of the household dishwasher, or based on usage data of the household dishwasher tracked during operation of the household dishwasher.

19. The method of claim 17, wherein the maintenance operation is performed by the robot.

20. The method of claim 17, further comprising:
outputting an instruction to a user to perform the maintenance operation.

\* \* \* \* \*